(12) United States Patent
McNulty

(10) Patent No.: US 9,460,333 B2
(45) Date of Patent: Oct. 4, 2016

(54) SYSTEM, METHOD AND APPARATUS FOR ELECTROMAGNETIC DETECTION AND ANALYSIS OF BIOMETRIC INFORMATION

(71) Applicant: Scott McNulty, Rowayton, CT (US)

(72) Inventor: Scott McNulty, Rowayton, CT (US)

( * ) Notice: Subject to any disclaimer, the term of this patent is extended or adjusted under 35 U.S.C. 154(b) by 0 days.

(21) Appl. No.: 14/293,683

(22) Filed: Jun. 2, 2014

(65) Prior Publication Data

US 2015/0347805 A1    Dec. 3, 2015

Related U.S. Application Data

(63) Continuation of application No. 13/905,848, filed on May 30, 2013, now Pat. No. 8,744,139, and a continuation-in-part of application No. 13/181,940, filed on Jul. 13, 2011, now Pat. No. 8,958,610.

(60) Provisional application No. 61/653,046, filed on May 30, 2012.

(51) Int. Cl.
*G06K 9/00* (2006.01)
*G06K 9/52* (2006.01)
*G06K 9/46* (2006.01)

(52) U.S. Cl.
CPC .............................. *G06K 9/00033* (2013.01)

(58) Field of Classification Search
None
See application file for complete search history.

(56) References Cited

U.S. PATENT DOCUMENTS

| | | | | |
|---|---|---|---|---|
| 5,982,914 | A * | 11/1999 | Lee et al. | 382/124 |
| 2007/0014443 | A1* | 1/2007 | Russo | G06K 9/00906 |
| | | | | 382/124 |
| 2009/0310831 | A1* | 12/2009 | Zhang et al. | 382/125 |
| 2011/0072264 | A1* | 3/2011 | McNulty | 713/168 |
| 2012/0134549 | A1* | 5/2012 | Benkley, III | 382/124 |

* cited by examiner

*Primary Examiner* — David F Dunphy
(74) *Attorney, Agent, or Firm* — Locke Lord LLP

(57) ABSTRACT

An apparatus, method and system are provided for sensing at least one biometric measure of an individual. An electrical current flows through an electrode to induce an electromagnetic field. The electromagnetic field stimulates and excites the molecules associated with the sweat gland pores and causes molecular compounds to fluoresce. An image of the fluoresced dermal surface is obtained and a biometric function is performed with data derived from the image. Alternatively, sweat gland pore biometric information may be derived from variations, fluctuations or disturbances to the electromagnetic field induced by the electrical current.

25 Claims, 12 Drawing Sheets

Major & Minor Root Scale

SYSTEM, METHOD AND APPARATUS FOR ELECTROMAGNETIC DETECTION AND ANALYSIS OF BIOMETRIC INFORMATION

This application is a continuation of U.S. patent application Ser. No. 13/905,848, filed May 30, 2013, which is a continuation-in-part of U.S. patent application Ser. No. 13/181,940, filed Jul. 13, 2011, which are incorporated herein by reference. Through U.S. patent application Ser. No. 13/905,848, this application claims the priority of U.S. Provisional Application No. 61/653,046, filed May 30, 2012, which is incorporated herein by reference.

FIELD OF THE INVENTION

The present invention relates to a system, method and apparatus for sensing and analyzing biometric information. More specifically, the present invention relates to a system, method and apparatus for inducing an electromagnetic field and detecting sweat gland pores as an identification, authentication and/or liveness biometric measure.

BACKGROUND

Biometric identification systems use sensor technologies to obtain information regarding an individual's unique physical characteristics and compare the obtained information with verified reference information to confirm the identity of the individual. Known biometric identification systems have used optical, thermal, capacitive, impedance, radio-frequency, conductance and ultrasonic based sensors for detecting biometric information.

Physical characteristics that are commonly used for biometric identification include unique features from an individual's face, iris, hand geometry, vein pattern, palm and fingerpads. The most predominantly used physical characteristics for biometric identification are the minutiae or macrofeatures found on the dermal surface of an individual's fingerpad. For example, an individual's fingerpad is covered with a pattern of ridges and valleys commonly referred to as a fingerprint. A typical fingerprint scan contains about 30 to 40 minutiae and macrofeatures which are unique biometric identification characteristics. The dermal surface of an individual's finger also has between 50 and 300 sweat gland pores located on the fingerprint ridges. Like an individual's fingerprint, the number and locations of sweat gland pores on an individual's fingerpad do not change and provide unique biometric identification characteristics. Moreover, the locations of an individual's sweat gland pores relative to the fingerprint minutiae or macrofeatures provides an additional biometric identification measure.

The common traits to biometric identification measures are their permanence and uniqueness. However, these basic traits also make the biometric identification systems vulnerable to spoofing. Spoofing is the act of using an artificial biometric sample (such as a "fake finger") containing a replica of an authorized individual's fingerpad to enable an unauthorized individual to gain access to a secured system. Spoofing may also be used to enable an individual to pass himself off as another individual at a security checkpoint. Typically, the replicated fingerpad is formed of a synthetic material such as gelatin (including gummi which is obtained by gelling aqueous solution of gelatin), silicone, epoxy, latex and the like.

Anti-spoofing systems typically are designed to detect the liveness of the physical sample presented to the biometric detection sensor. Most of these systems involve relatively large sensors which are unacceptable for mobile or portable devices. In addition, anti-spoofing systems are typically directed to detecting a liveness measure of the finger such as finger surface resistance, temperature, pulse, moisture, and blood oximetry. These systems, however, can be circumvented because they operate by comparing the detected liveness measure value to a predetermined acceptable range. Namely, it is possible to design an artificial biometric sample which produces a detected liveness measure within a known acceptable range. For example, artificial biometric samples can be made of materials with electrical properties resembling that of a living finger and which yield a biometric liveness measure within a given acceptable range.

Therefore, it would be beneficial to provide a biometric identification system based on the detection and analysis of both permanent and variable unique physical characteristics so as to provide identification, authentication and/or proof of a live biometric sample.

SUMMARY OF THE INVENTION

An objective of the invention is to provide an apparatus, method and system for biometric sensing based on the application of an electromagnetic field to stimulate and excite the molecules associated with an individual's dermal surface and cause compounds within the molecules to fluoresce.

It is a further objective of the invention to provide an electrical current in a local environment to induce an electromagnetic field sufficient to stimulate and excite the molecules associated with an individual's dermal surface and cause compounds within the molecules to fluoresce. In one embodiment of the invention, the electrical current may be an alternating current having a frequency of 64 MHz or less. Further, the local environment may be a conductive surface comprising a transparent conductive material such as Indium Tin Oxide (ITO), or the like.

It is a further objective of the invention to provide an electrical current at a level below that necessary to cause physiological reaction with an individual's dermal surface. For example, the electrical current may be an alternating current between about 0.01 milliamps and about 25 milliamps and having a frequency of about 60 Hz or less, and more specifically between about 0.5 milliamps and about 5.0 milliamps and having a frequency of between about 20 Hz and 50 Hz. Alternatively, insulating materials may be used in connection with the electrically charged conductive surface to protective against unwanted physiological reaction with the individual's dermal surface. It will be understood that in such instances, a higher electrical current having an increased frequency (e.g., 64 MHz or higher) may be used with the present invention to induce an electromagnetic field sufficient to stimulate and excite the molecules associated with the individual's dermal surface and cause compounds within the molecules to fluoresce.

A further objective of the present invention is detecting the locations of sweat gland pores on an individual's dermal surface by exciting and fluorescing molecules on the dermal surface as well as within the sweat glands associated with the sweat pores.

Another objective of the invention is performing a biometric function, such as biometric identification or authentication based on the detection and analysis of sweat gland pores data derived from an image of fluoresced molecular compounds associated with an individual's dermal surface. The detected sweat gland pore information is compared to reference sweat gland pore information such that biometric identification or authentication is based on a determination whether there is an acceptable percentage or number of matching sweat gland pores and absence of false detected sweat gland pores.

Another objective of the invention is an apparatus, method an system for establishing proof of liveness of a biometric sample based on the detection and analysis of an individual's sweat gland pores. A first proof of liveness is provided by the capture of an image derived from the individual's dermal surface having fluoresced biological points identifying sweat gland pore locations. A second proof of liveness is provided by the detection of sufficient minimal variation in the size, shape, intensity or brightness of the fluoresced biological points of the detected sweat gland pores and reference sweat gland pore information.

It is another objective of the invention to provide and apparatus, method and system for biometric sensing based on the detection of variations, fluctuations or disturbances to an electromagnetic field induced by an electrical current.

It is a further objective of the invention to provide an electrical current in a local environment to induce an electromagnetic field sufficient to provide measurable variations, fluctuations or disturbances to the electromagnetic field corresponding to the physical contours of the sweat gland pores on an individual's dermal surface. In one embodiment of the invention, the electrical current may be an alternating current having a frequency of 64 MHz or less. Further, the local environment may be a conductive surface comprising a transparent conductive material such as Indium Tin Oxide (ITO), or the like.

It is a further objective of the invention to provide an electrical current at a level below that necessary to cause physiological reaction with an individual's dermal surface. For example, the electrical current may be an alternating current between about 0.01 milliamps and about 25 milliamps and having a frequency of about 60 Hz or less, and more specifically between about 0.5 milliamps and about 5.0 milliamps and having a frequency of between about 20 Hz and 50 Hz. Alternatively, insulating materials may be used in connection with the electrically charged conductive surface to protective against unwanted physiological reaction with the individual's dermal surface. It will be understood that in such instances, a higher electrical current having an increased frequency (e.g., 64 MHz or higher) may be used with the present invention to induce an electromagnetic field sufficient to provide measurable variations, fluctuations or disturbances to the electromagnetic field corresponding to the physical contours of the sweat gland pores on an individual's dermal surface.

Another objective of the invention is performing a biometric function, such as biometric identification or authentication based on the detection and analysis of sweat gland pores data derived from the variations, fluctuations or disturbances to the electromagnetic filed induced by an electrical current. The detected sweat gland pore information is analyzed and compared to reference sweat gland pore information such that biometric identification or authentication is based on a determination whether there is an acceptable percentage or number of matching sweat gland pores and absence of false detected sweat gland pores.

Another objective of the invention is an apparatus, method an system for establishing proof of liveness of a biometric sample based on the detection and analysis of an individual's sweat gland pores. A first proof of liveness is provided by the magnitude of the variations, fluctuations or disturbances to the electromagnetic field induced by the electrical current identifying the location of sweat gland pores. A second proof of liveness is provided by the detection of sufficient minimal variation in the size or shape of the detected sweat gland pores compared to reference sweat gland port information, or sufficient minimal variation in the intensity or magnitude of the variation, fluctuation or disturbance to the electromagnetic field corresponding to each detected sweat gland pore compared to reference sweat pore information.

Yet another objective of the invention is a biometric identification or authentication based on the detection and analysis of an individual's fingerprint and sweat gland pores.

A further objective of the present invention is a sweat pore biometric identification system comprising a portable biometric detection apparatus and a remote central database containing reference sweat pore information.

A further objective of the present invention is to provide an audio biometric identification system represented by a musical pattern based on an individual's biometric information. Preferably, the musical pattern is based on an individual's fingerprint and/or sweat gland pore biometric information.

A further objective of the present invention is to provide an interactive verification or authorization system which requires participation by one or more individuals.

A further objective of the present invention is to provide a biometric identification system which integrates musical and/or social networking features such that it is perceived to be less intrusive than conventional biometric identification systems.

DESCRIPTION OF DRAWINGS

These and other aspects of the invention will be described with reference to the drawings, in which.

DETAILED DESCRIPTION OF THE INVENTION

Figure 1:
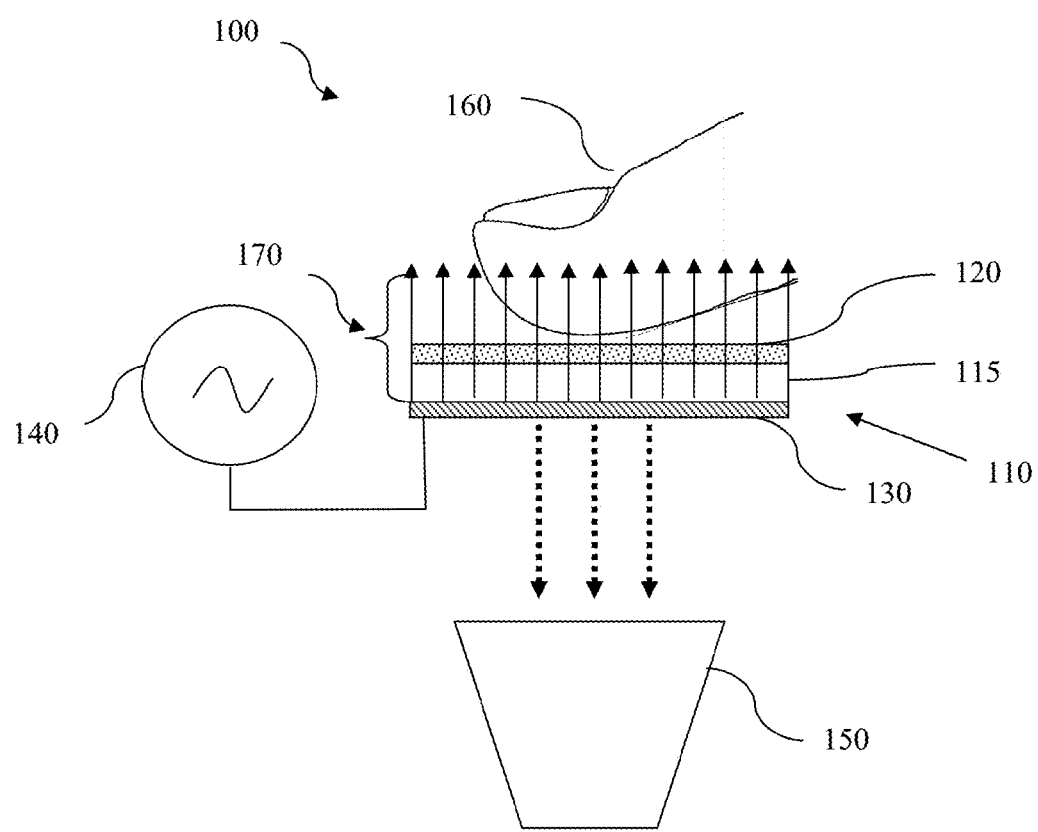
FIG. 1 is a schematic diagram of a sweat pore biometric detection apparatus according to an embodiment of the present invention.

FIG. 1 is a schematic diagram illustrating an embodiment of the present invention for biometric identification and proof of liveness based on the detection and analysis of sweat gland pores on an individual's fingerpad. As shown in FIG. 1, the biometric identification apparatus 100 comprises a voltage source 140, a transparent electrode 110, and an image capture device 150. Voltage source 140 is configured to generate an electrical current through transparent electrode 110, which induces an electromagnetic field 170. Preferably, voltage source 140 is an alternating current voltage source and the resulting alternating electrical current transmitted through transparent electrode 110 is sufficient to induce an electromagnetic field of the necessary magnitude to stimulate and excite the molecules associated with an individual's dermal surface and cause compounds within the molecules to fluoresce. In one embodiment, the resulting alternating electrical current may be between about 0.01 milliamps and about 25 milliamps and have a frequency of about 60 Hz or less. In another embodiment, the resulting alternating electrical current may be between about 0.5 milliamps and about 5.0 milliamps and have a frequency of between about 20 to about 50 Hz. It will be understood, however, that any electrical current that induces an electromagnetic field which enables biometric identification and/or proof of liveness based on the detection and analysis of sweat gland pores falls within the scope of the present invention. For example, a current greater than about 25 milliamps and having a frequency greater than about 60 Hz (e.g., 64 MHz or higher), may be used if a suitable insulator is used to prevent physiological reaction with an individual's dermal surface. Similarly, a current less than about 0.01 milliamps may be used if a suitable amplifier or other device is used to enable the detection of the variations, fluctuations or disturbances to the electromagnetic field caused by the interaction with the individual's dermal surface. In addition, the electromagnetic field may be induced by a pulsed electrical current. Although not shown in FIG. 1, it will be appreciated that the electrical circuitry of apparatus 100 is configured to provide the desired electrical current through the electrode 110, which, in turn, induces electromagnetic field 170. It will be understood that the specific form of the electrical circuitry including the use of a transparent conductive surface is optional for the practice of the present invention. Any electrical circuitry for providing an electrical charge to induce an electromagnetic field sufficient to stimulate and excite the molecules associated with an individual's dermal surface and cause compounds within the molecules to fluoresce falls within the scope of the present invention.

Transparent electrode 110 may comprise a transparent glass substrate 115 having a transparent current conductive coating layer 130 on its bottom surface. For example, the transparent glass substrate may comprise optical glass material and the transparent conductive coating layer may comprise Indium Tin Oxide (ITO) material, or the like. In addition, the top surface of the transparent electrode 110 is dimensioned to receive the individual's fingerpad and may be coated with a transparent polymer material 120 to prevent electrical charge from being transmitted to the individual's fingerpad. It will be understood that transparent electrode 110 may be configured to receive multiple fingerpads, a palm or any other skin surface having sweat gland pores.

Image capture device 150 is configured to capture an image of the fluoresced biological points representing the location, size, shape and activity of sweat gland pores on the fingerpad placed in the proximity of the transparent electrode 110. Image capture device 150 may comprise a solid state camera such as a computer controlled CCD array camera configured to capture real-time visualization of the fingerpad image or a spectrophotometer. It will be understood that the image capture device may alternatively capture a negative of the image, thereby representing the biological points as black points on a white background. It will also be understood that the image capture device may be used on conjunction with an external light source such as an infrared or ultraviolet light source to enhance the quality of the captured image.

Without wishing to be bound by any scientific theory and explanation, applicant believes that the electrical current produced by the voltage source 140 induces an electromagnetic field 170 in the vicinity of the transparent electrode 110. When an individual's finger is placed in the proximity of the top surface of transparent electrode 110, electromagnetic field 170 stimulates and excites molecules associated with complex metabolic waste substances (such as sweat gland amino acid molecules), loosely bound atmospheric water vapor residing on the dermal surface of an individual's fingerpad, and other materials including atomic oxygen. This, in turn, causes compounds adjacent to the ions within the excited molecules to become visible or fluoresce. It is further believed that the fluoresced molecules travel along the dermal surface to open sweat pores because the high levels of salt, water and amino acid in the sweat glands provides a superior grounding path for the ions.

Apparatus 100 may be adapted to capture an image containing both a fingerprint pattern and fluoresced points identifying the sweat pores. For example, it will be understood that the resolution of the image capture device 150 and/or the voltage, rate and/or duration of the electrical charge generated by voltage source 140 may be modified to capture an image of both the fingerprint and fluoresced points on the fingerpad. Capture of the fingerprint image does not require an external light source reflected on the fingerpad because the fingerprint is illuminated by the fluorescence of the excited molecules caused by the electromagnetic field 170. It will be understood, however, that an external light source may be used to illuminate the fingerprint and/or enhance the captured image of the fluoresced biological points on the fingerpad. For example, an external white light source may be used in conjunction with the fingerprint image capture and/or an external infrared or ultraviolet light source may be used to enhance to captured image of fluoresced biological points.

Figure 2:
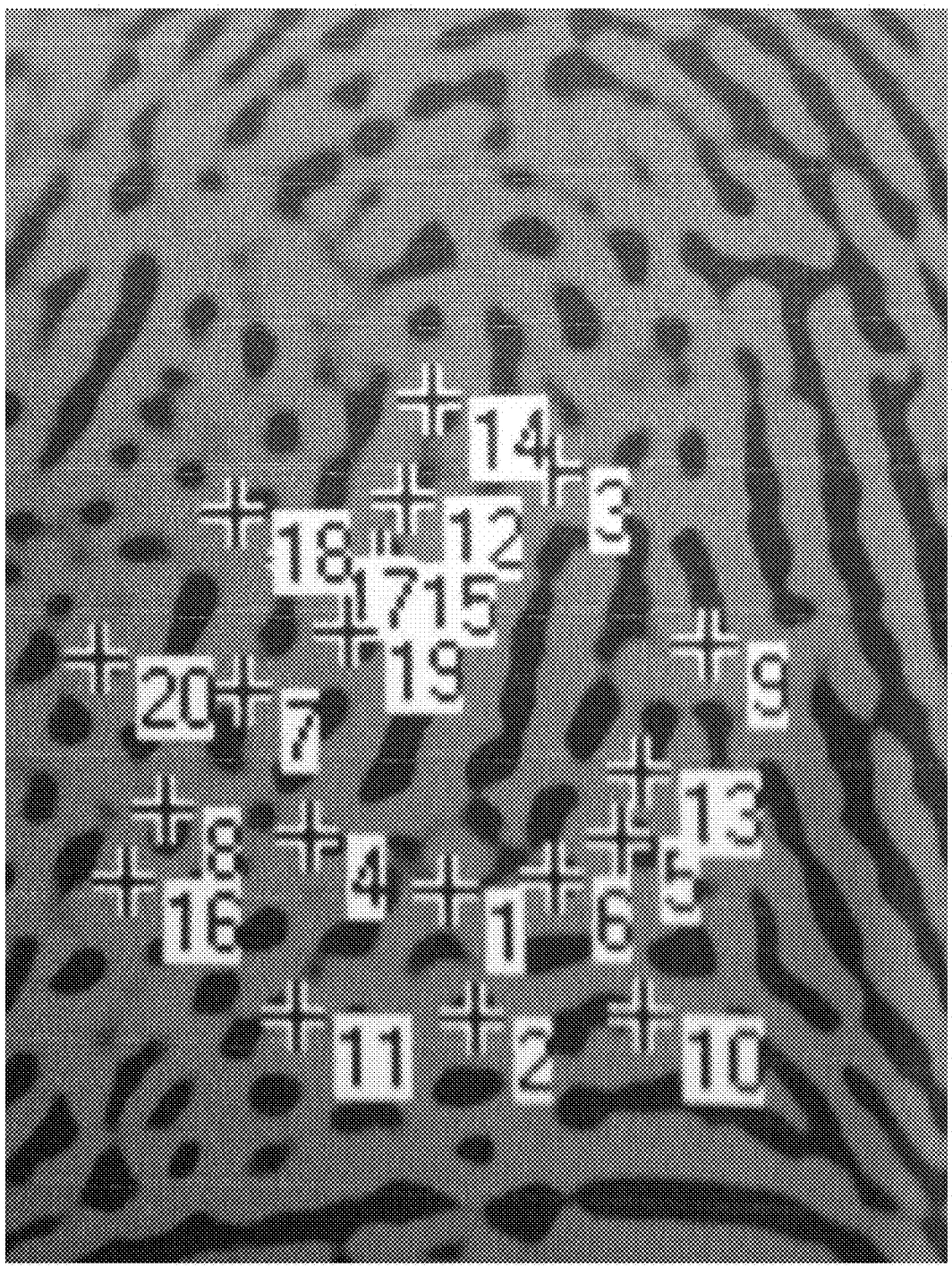
FIG. 2 is an exemplary illustration of a fingerpad image produced according to the present invention.

Alternatively, apparatus 100 may be configured to separately capture an image of the points of fluorescence corresponding to the sweat gland pore locations and an image of the fingerprints. According to this configuration, apparatus 100 may include a light source and the fingerprint biometric information may be obtained by image capture device 150. It will be appreciated that the fingerprint biometric information may also be obtained using a scanner or any other type of known system for fingerprint sensing. If separately obtained, the system may be configured to juxtapose the sweat gland pore and fingerprint biometric information as shown in FIG. 2 to map the locations of the sweat gland pores relative to the fingerprints and provide a third biometric measure.

Further, the embodiment of the present invention shown in FIG. 1 may also be adapted for use with any portable device having a camera such as smart phones and tablets. According to this adaptation of the present invention, the portable device having the built-in camera comprises the image capture device 150. A separate apparatus 100 comprises the voltage source 140 and the transparent electrode 110. During operation, the transparent electrode 110 is disposed at a position relative to the portable device camera lens to enable the camera to capture an image of the fluoresced biological points. A software application may be downloaded on the portable device to integrate and coordinate the generation of the electrical current and subsequent electromagnetic field with the image captured by the camera. In addition, the software application may also be configured to analyze the biological fluorescent points, identify the sweat gland pore locations and/or perform a biometric identification or authentication operation. The portable device may be configured to store the reference biometric information for performing the identification or authentication processes. Alternatively, the reference biometric information may be stored on a remote database and the portable device may be configured to communicate with the remote database for performing the identification or authentication processes. It will also be understood that the portable device may be configured to transmit the captured image of the fluoresced biological points or data representative thereof to a remote device, which, in turn performs the analysis, identification and verification/authentication operations and communicates the results back to the portable device. In this way, the biometric identification system may be implemented for providing secure access to data and/or applications stored on the portable device, networks accessible through the portable device (e.g., VPNs, social networks, etc.) or operations enabled by the portable device (e.g., on-line banking, on-line shopping, etc.).

In addition, a further level of biometric authentication or verification may be established by incorporating the basic biometric identification system of the present invention into a social network system. For example, an individual seeking to perform an on-line activity requiring biometric authentication or verification may be required to request one or more designated individuals on a network to vouch for the requesting individual's identity or authorize the on-line activity. Such a vouch or authorization request may be transmitted automatically upon positive biometric identification by the requesting individual. In response to receiving such a request, each designated individual may vouch for the requesting individual's identity or authorize the on-line activity by transmitting an acknowledgement confirming that the designated individual is on the requesting individual's vouch/authorization list. Alternatively, in higher security authentication or verification processes, each designated individual may be required to establish positive biometric identification, using, for example, the biometric identification system of the present invention. It will be understood that the effectiveness of the vouching/authorization process increases with the number of designated individuals. Preferably, the number of designated individuals for the vouching/authorization process is three or more.

It will be understood that light impulses, electrical pulses, acoustic pressure and/or vibration techniques may be used alone or in combination with the electromagnetic field 170 to stimulate and excite the molecules on the dermal surface, and cause the compounds adjacent the ions within the excited molecules to fluoresce. For example, voltage source 140 may be configured to generate an electrical current at pulsed intervals within a range of about 1 to 10 or more pulses a second, with each pulse having a duration of about 1 microsecond ($10^{-6}$ seconds). In addition, it will be understood that the exemplary apparatus illustrated in FIG. 1 may be configured to capture and analyze image data from any dermal surface having sweat pores with associated molecules suitable for stimulation, fluorescence and image capture, including multiple fingerpads and palms or any portions thereof.

Figure 3:
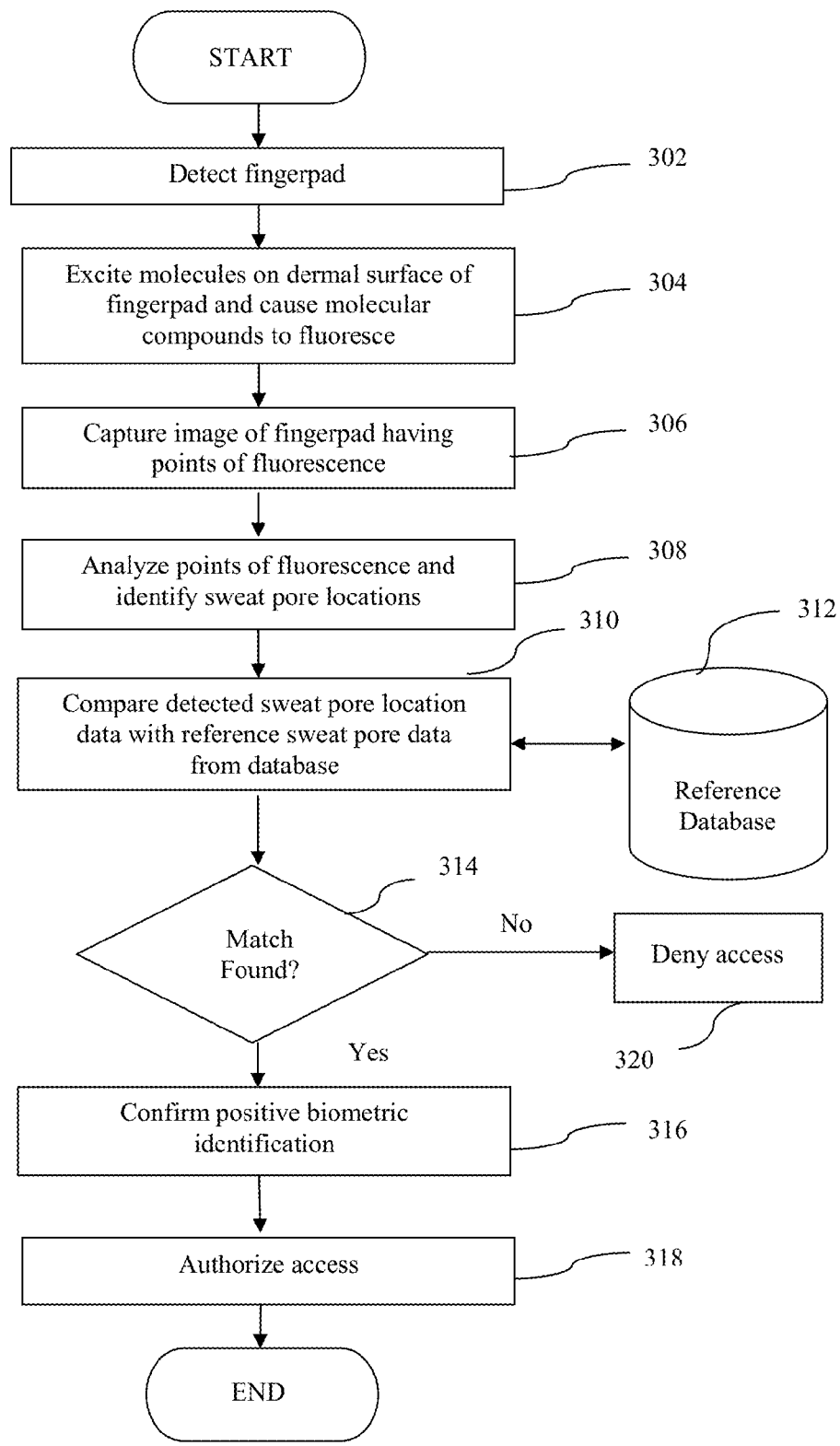
FIG. 3 is a flowchart illustrating an exemplary process for the detection and analysis of sweat pores for biometric identification according to the present invention.

According to one embodiment of the present invention, the biometric identification system is designed to detect sweat pores, independent of any other feature of the dermal surface such as a fingerprint. FIG. 3 is a flowchart illustrating an exemplary process for detecting and analyzing sweat pores in accordance with the invention. The process shown in FIG. 3 may be implemented in a biometric identification and proof of life system using, for example, the apparatus shown in FIG. 1.

The process begins when the sweat pore biometric identification system detects a fingerpad on the top surface of a transparent plate (step 302). For example, sweat pore biometric identification apparatus 100 detects fingerpad 160 on the top surface of transparent electrode plate 110 in FIG. 1. The electrical current generated by voltage source 140 induces an electromagnetic field which stimulates and excites molecules associated with the dermal surface of the fingerpad and, thereby, causes compounds adjacent ions within the molecules to fluoresce (step 304). Then, the sweat gland pore biometric system uses an image capture device 150 (e.g., a CCD array camera) to obtain an image of the fingerpad with the fluoresced biological points, such as the fingerpad image shown in FIG. 3 (step 306). The capture of an image of the dermal surface having fluoresced biological points constitutes proof of liveness since only a living being is capable of providing such fluoresced biological points. The apparatus may include a controller (not shown) configured to interface with image capture device 150 to coordinate the detection of the fingerpad and the image capture of the fluoresced biological points on the fingerpad. Such a controller may also be configured to interface with voltage source 140 to coordinate the detection of the fingerpad and the generation of the electrical current and resulting electromagnetic field for stimulating and exciting the molecules associated with the dermal surface.

Next, the sweat pore biometric identification system analyzes the fluoresced biological points on the image (step 308) and uses an algorithm to compare the biometric information obtained from the image with reference biometric information stored in a repository, such as Reference Database 312 (step 310). The step of analyzing the fluoresced biological points may be performed by the sweat pore biometric identification apparatus 100 or a separate device (e.g., a secure network server or a local computer device) coupled in communication with apparatus 100. Similarly, the step of comparing the biometric information obtained from the captured image with the biometric information stored in a repository may be performed by the sweat pore biometric identification apparatus 100 or a separate device coupled in communication with apparatus 100. Reference Database 312 may be maintained on the apparatus, a local storage device or a remote storage device. For security purposes, communications within the sweat pore biometric identification system (e.g., between apparatus 100 and Reference Database 312) are preferably encrypted. For this same reason, data stored on Reference Database 312, apparatus 100 or any other device used in the sweat pore biometric identification system is preferably encrypted.

Accordingly, apparatus 100 comprises cryptographic capabilities for encrypting transmitted communications, decrypting received encrypted communications and encrypting stored data.

Step 308 of analyzing the fluorescent biological points depicted on the captured image may include converting the visual information to a digital format. This may be done by any of a number of different techniques, including gray-scale analysis wherein a two-dimensional gray scale matrix is created by assigning gray-scale values for each pixel in the captured image. By way of example, the gray-scale values may span a range from 0 to 255 with 0 corresponding to black and 255 corresponding the brightest or most intense fluorescence of the biological points on the captured image. The gray-scale matrix may then be used to map the location, size and intensity of each detected sweat pore on the fingerpad image. Various known techniques may be used to extract this sweat pore information from the gray-scale matrix, including noise reduction, contrast enhancement, binarization, thinning, healing and feature extraction. For example, the data generated from the captured image may be filtered to decrease the effect of noise captured on the image. This gray-scale matrix data may be encoded in a biometric barcode as explained in more detail below.

After comparing the detected sweat pore biometric information with the stored reference biometric information, a determination is made as to whether the detected sweat pore biometric information matches an entry on the reference database (step 314). If no match is found (no output of step 314), the process proceeds to step 320. If a match is found (yes output of step 314), the process proceeds to step 316 where an indicator is provided confirming a positive biometric identification. Such an indicator is an optional feature of the illustrated process and may include a visual display and/or an audio signal. The process then proceeds to step 318 where the biometric identification system authorizes access to a secure area or device.

The process of comparing the sweat pore information from the captured image with the stored reference sweat pore information may involve matching the locations of detected sweat pore with reference sweat pore locations. For example, the number or percentage of matches may be measured by a correlation score. The correlation score may also take into account the number or percentage of false detected sweat pores (i.e., instances where there is no reference sweat pore location which corresponds to a detected sweat pore location). The correlation score is compared with a predetermined standard score for determining whether the detected biometric information matches the reference biometric information.

The sweat pore biometric identification system of the present invention may also be used to provide a second proof of liveness measure. Not only are an individual's sweat pores a fixed biometric in the sense that their locations remain unchanged throughout the individual's life, but they also can be considered as proof of liveness because the amount and composition of complex metabolic waste substances contained in sweat secreted from an individual sweat gland and the shape, size and degree to which each sweat pore is open (or even closed altogether or clogged) varies depending on certain conditions, including the prevailing emotional and/or physical state of the individual. Nerve fibers associated with an individual's sweat glands function to control the degree to which a sweat pore is open or even closed and the amount and composition of the sweat secreted from or contained within the sweat glands based on an individual's emotional state. For example, an individual's prevailing level of excitement, anxiety or fear may cause the nerve fibers to activate the sweat glands to secrete varying amounts of sweat. In addition, these nerve fibers may also cause an individual's sweat pores to open to varying degrees or even close in response to an individual's emotional state. In contrast, the lack of any detectable variation of the sensed biological points identifying the sweat pores is an indication of a spoofing attempt. This is because over time, there will necessarily be at least some minimal variation in the sensed biological points of a living being and identical or essentially identical repeated detection of these sensed biological points would indicate an artificial non-living biometric sample. Accordingly, an analysis of the variation of an individual's sweat pores can be used as a proof of liveness.

Figure 4:
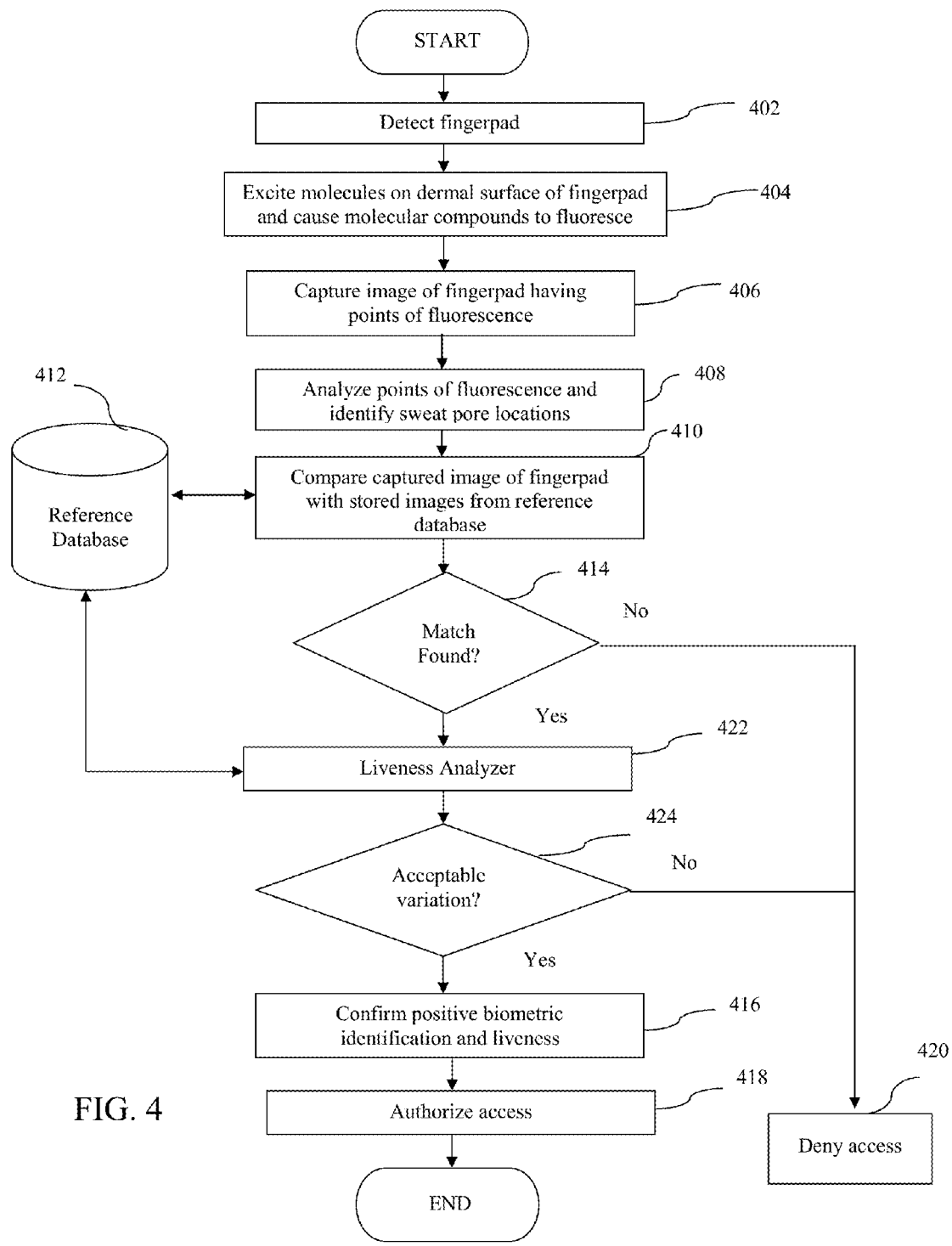
FIG. 4 is a flowchart illustrating an exemplary process for the detection and analysis of sweat pores for biometric identification and proof of liveness according to the present invention.

FIG. 4 provides a flowchart illustrating an exemplary process using sweat pore information as a biometric for identification and proof of liveness. The process shown in FIG. 4 may be implemented in a biometric identification and liveness system using, for example, the apparatus shown in FIG. 1.

As with the process illustrated in FIG. 3, the process starts by detecting a fingerpad on the top surface of a transparent electrode plate (step 402). Electrical current generated by voltage source 140 induces an electromagnetic field that stimulates and excites molecules associated with the dermal surface of the fingerpad causing the molecular compounds to fluoresce (step 404). Then an image capture device obtains an image derived from the fluoresced biological points (step 406).

Next the image is analyzed to identify sweat pore locations on the fingerpad (step 408) and the identified sweat pore locations are compared with reference sweat pore data stored on a database (step 410). Then a determination is made (step 414) if the identified sweat pore locations match an entry on the database. If no match is found, (no output of step 414), the process proceeds to step 420. If a match is found (yes output of step 414), the process proceeds to step 422.

In one embodiment, step 422 uses an algorithm to compare the sweat pore data detected from the individual and the matching reference database sweat pore data to determine the degree of variation therebetween. The variation analyzed by the algorithm may include the intensity or brightness of the fluorescence of one or more sweat pores, the size or shape of the sweat pores, and even the ability to detect the presence of one or more specific sweat pores. Alternatively, the liveness analyzer algorithm may compare past detected sweat pore data maintained in a reference database for the identified individual with the detected sweat pore data to determine the degree of variation therebetween. Or the liveness analyzer algorithm may compare successive contemporaneous detected sweat pore data to determine the degree of variation therebetween. Proof of liveness is established where there is at least some minimal variation in the compared sweat pore data. The lack of any variation would indicate an artificial biometric sample and yield a no output in step 424.

In addition, certain variations in an individual's detected sweat pores can be used as an indicator of the individual's emotional or physical state. For example, even if an individual biometric identification is verified or authenticated, the detected biometric information based on variation of sweat pore biometric information may be useful for identifying individuals who may be experiencing emotional, psychological or even physical distress. This information may be particularly useful for identifying individuals who may present potential security threats. Alternatively, this information may be useful to identify individuals who may be in need of immediate medical attention.

In another embodiment of the invention, the biometric identification apparatus is designed to detect the sweat gland pores along with a second biometric such as a fingerprint to enhance biometric identification reliability. Indeed, the unique method of stimulating the molecules associated with the fingerpad and causing molecular compounds to fluoresce in accordance with the present invention also enables the simultaneous detection of sweat pore and fingerprint biometric information. Specifically, the fluorescence of the molecular compounds not only creates biological points which identify the location of sweat gland pores, but also illuminates the fingerprint for image capture.

Figure 5:
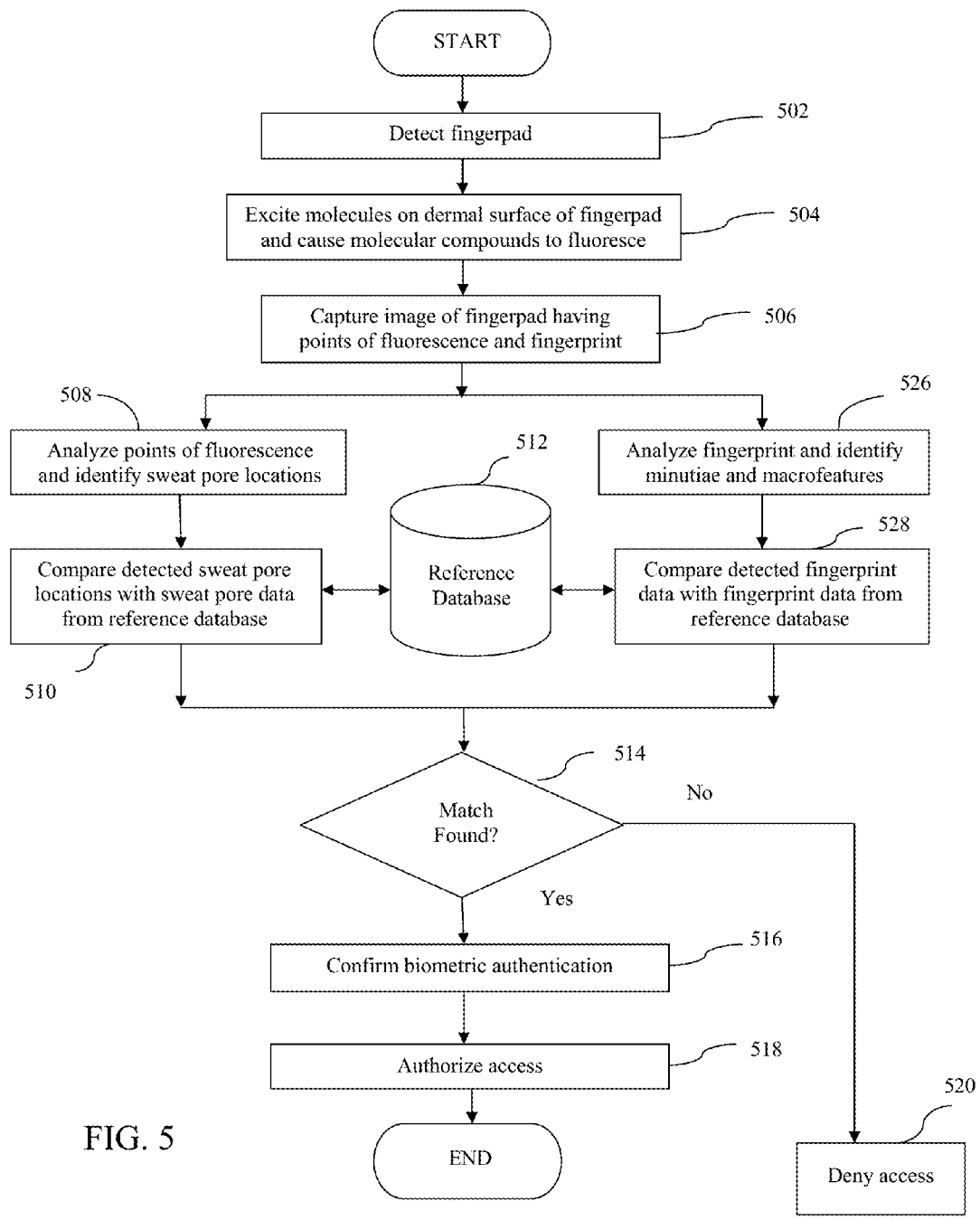
FIG. 5 is a flowchart illustrating an exemplary process for the detection and analysis of sweat pores and fingerprints for biometric identification according to the present invention.

FIG. 5 is a flowchart illustrating an exemplary process for detecting and analyzing sweat gland pore and fingerprint biometric information in accordance with the present invention. The process shown in FIG. 5 may be implemented in a biometric identification system using, for example, the apparatus shown in FIG. 1.

As described above with reference to the exemplary biometric identification process illustrated in FIG. 3, the process begins with the detection of a fingerpad on the top surface of the transparent electrode plate (step 502). The electric current through electrode 140 generated by voltage source 140 induces an electromagnetic field 170 to stimulate and excite molecules associated with the dermal surface of the fingerpad and cause molecular compounds to fluoresce (step 504). An image capture device 150 then obtains an image of the fingerpad with the fluoresced biological points and illuminated fingerprint (step 506).

Next the biometric identification system analyzes the sweat gland pore biometric information in the form of the fluoresced biological points and identifies sweat gland pore locations (step 508). The locations of the sweat gland pores may be identified by x- and y-coordinates on a two-dimensional matrix containing a reference point. Such a reference point, for example, may be a designated minutiae or macrofeature identified on the fingerprint captured by the image. Alternatively, the relative locations of the sweat gland pores may be identified by vector plot coordinates.

The detected sweat gland pore locations are then compared with reference sweat gland pore biometric information maintained in a secure database 512 (step 510). In parallel with these sweat gland pore detection and comparison steps, the process also performs a fingerprint identification step, wherein the fingerprint pattern from the captured image is analyzed to identify unique minutiae and macrofeatures (step 526). Next, the minutiae and macrofeatures are compared to reference fingerprint data stored in a secured database (step 528). Finally, a combined determination providing enhanced reliability is made based on an evaluation of the matches resulting from both the sweat pore and fingerprint biometric identification processes (step 514). Alternatively, the sweat pore and fingerprint biometric identification processes may occur in series with either the sweat pore biometric identification providing a preliminary determination subject to confirmation by fingerprint biometric identification or vice versa.

This embodiment may be further adapted to perform a third biometric measure based on the combined sweat pore and fingerprint biometric information. Specifically, the minutiae or macrofeatures contained in the fingerprint may be used to facilitate a mapping of the sweat pore locations yielding a combined fingerprint/sweat pore biometric.

The biometric identification information obtained by the present invention may also be used to create a unique biometric barcode identifier for each individual. This barcode may be created using one or more of the biometric measures sensed by the present invention, including the x- and y-coordinates of the sweat gland pore locations on a two-dimensional matrix, sweat gland pore activity level as measured by brightness or intensity, fingerprint information (including ridge/valley patterns and minutiae/macrofeatures), and the locations of sweat gland pores relative to the fingerprint ridge/valley patterns and/or minutiae/macrofeatures.

As mentioned above, the fingerprint (ridge/valley patterns and minutiae/macrofeatures) and sweat gland pore locations on an individual's fingerpad are invariant throughout an individual's life and are generally considered fixed biometric measures. Accordingly, the locations of and spacing between the fingerprint ridges/valleys and minutiae/macrofeatures, as well as the locations of and spacing between sweat gland pores provide unique biometric measures for each individual. As disclosed above, in one embodiment the present invention yields an image derived from an individual's fingerpad containing both a fingerprint pattern and sweat pore locations identified by fluorescent biological points. According to the present invention, a biometric barcode may be created from a linear scan of the fingerprint biometric information and/or the sweat pore biometric information contained on the captured image.

More specifically, a linear scan of the image in a reference direction including a reference point may be reduced to binary data as a function of the position across the individual's fingerpad. For example, a linear scan of the sweat pore location information on the fingerpad image in the x-coordinate direction yields a signal with maxima and minima which correspond to fluoresced and non-fluoresced points on the image. The fluoresced points represent sweat pore locations and the non-fluoresced points represent space on the fingerpad between sweat pores. These maxima and minima are then reduced to a binary ONE or ZERO, respectively. This binary data can be further reduced to a series of lines and spaces of known widths to create a first unique barcode representative of the relative locations of sweat pores along the linear scan of the image in the x-coordinate direction. In this same manner, a second unique barcode identifier may be based on the relative locations of sweat gland pores along a linear scan of the image in the y-coordinate direction. Further, a third unique barcode identifier may be based on the activity level as indicated by measured brightness or intensity of the fluoresced points on the image along a linear scan of the image. In addition, a fourth unique barcode identifier representative of fingerprint ridge/valley pattern and/or minutiae/macrofeature locations may be derived from a linear scan of the image in a reference direction including a reference point. Each of these unique barcodes are referred to as a one-dimensional bar code since they are representative of a single biometric measure.

In addition to these three one-dimensional barcodes, any two of these barcodes may be combined to provide a two-dimensional barcode derived from two different biometric measures. Further, any three of these barcodes may be combined to provide a three-dimensional barcode derived from the three of the biometric measures. In addition, all four of the exemplary barcodes may be combined to provide a four-dimensional barcode.

These barcode identifiers may be used in a myriad of different ways with the biometric identification or authentication systems of the present invention. For example, these aspects of the invention may be used for verifying and authenticating an individual's identity in connection with commercial air travel. To this end, the process illustrated in FIG. 3 may be used to confirm that the passenger is approved for travel (i.e., not on a no-fly list). In order to obtain a ticket, the passenger must be authorized to travel via the process illustrated in FIG. 3. If authorized, the passenger's biometric barcode will be printed on the ticket. Next, in order to board the plane, the passenger must be authenticated using the process illustrated in FIG. 8 (described below). First, the passenger must present the ticket with the biometric barcode. Then the passenger's biometric identity must match the biometric identity associated with the barcode on the ticket. In addition, if the passenger checks luggage on the aircraft, the passenger's biometric barcode will be printed on each baggage tracking label. This will facilitate the retrieval of the passenger's checked baggage from the aircraft in the event the passenger doesn't board the aircraft or is denied boarding the aircraft. In addition, the barcode on the baggage tracking label may also be used at the baggage claim site to prevent unauthorized individual's from taking a passenger's luggage.

The biometric identification and barcode aspects of the present invention may also be used by mail delivery or courier services for assigning an individual's identity to a package or letter. In this regard, the biometric identification system and barcode enable the delivery or courier service to identify the individual who shipped a package or letter. As will be appreciated, this will function as a strong deterrent against the use of mail delivery or courier services for the shipment of illegal materials, including explosives or illicit drugs.

According to a further aspect of the present invention, an individual's biometric identification may be manifested by an audio representation based on a combination of multiple pitches of notes on a music scale. It will be understood that this audio representation may be based on individual's fingerprint biometrics, sweat gland pore biometrics, combinations of fingerprint and sweat gland pore biometrics, or any other biometrics such as the unique characteristics of an individual's face, iris, hand geometry, vein pattern and palm.

Figure 6:
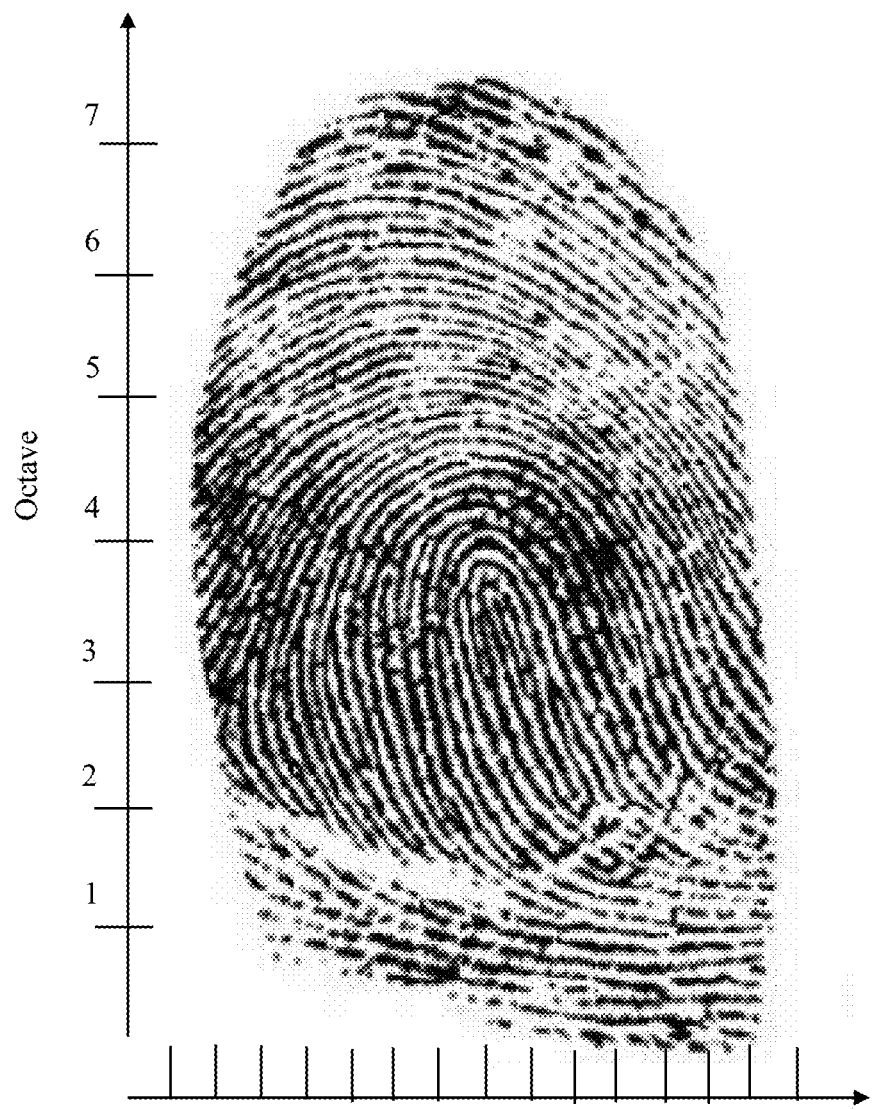
FIG. 6 is a schematic illustrating an embodiment of a musical representation of a biometric identification

For example, as illustrated in FIG. 6, a two-dimensional analog or digital representation of an individual's fingerprint may be converted to a unique musical pattern using 7 octaves to represent one dimensional aspect of the two-dimensional biometric information and the major & minor root scale to represent the other dimensional aspect of the two-dimensional biometric information. The resulting combination of the octaves and major & minor root scale yields a unique "musical playing pattern." With regard to an individual's fingerprint biometrics, these dimensional aspects may include the fingerprint ridge shape and location, distance between ridges, width of ridges or any other unique minutiae or macrofeatures of the fingerprint. In addition, a third unique fingerprint biometric may be used to provide a three-dimensional musical pattern where the volume, base intensity, chords, key signatures, scales, notes, etc. are varied.

By way of further example, a two-dimensional analog or digital representation of the locations of sweat gland pores on an individual's fingerpad may also be converted to a unique musical pattern using the same 7 octave and major & minor root scale discussed above. In this regard, analog or digital representations of the sweat gland pore locations are mapped on a two-coordinate axis with the 7 octaves defining one coordinate axis and the major & minor root scale defining the other coordinate axis. As described in the fingerprint example above, a third sweat gland pore biometric may be used to create a three-dimensional musical biometric representation. For example, the size, shape or activity level biometric of the sweat gland pores may be corresponded with the volume, base intensity, chords, key signatures, scales notes, etc. as a third dimension of the music pattern.

Figure 7:
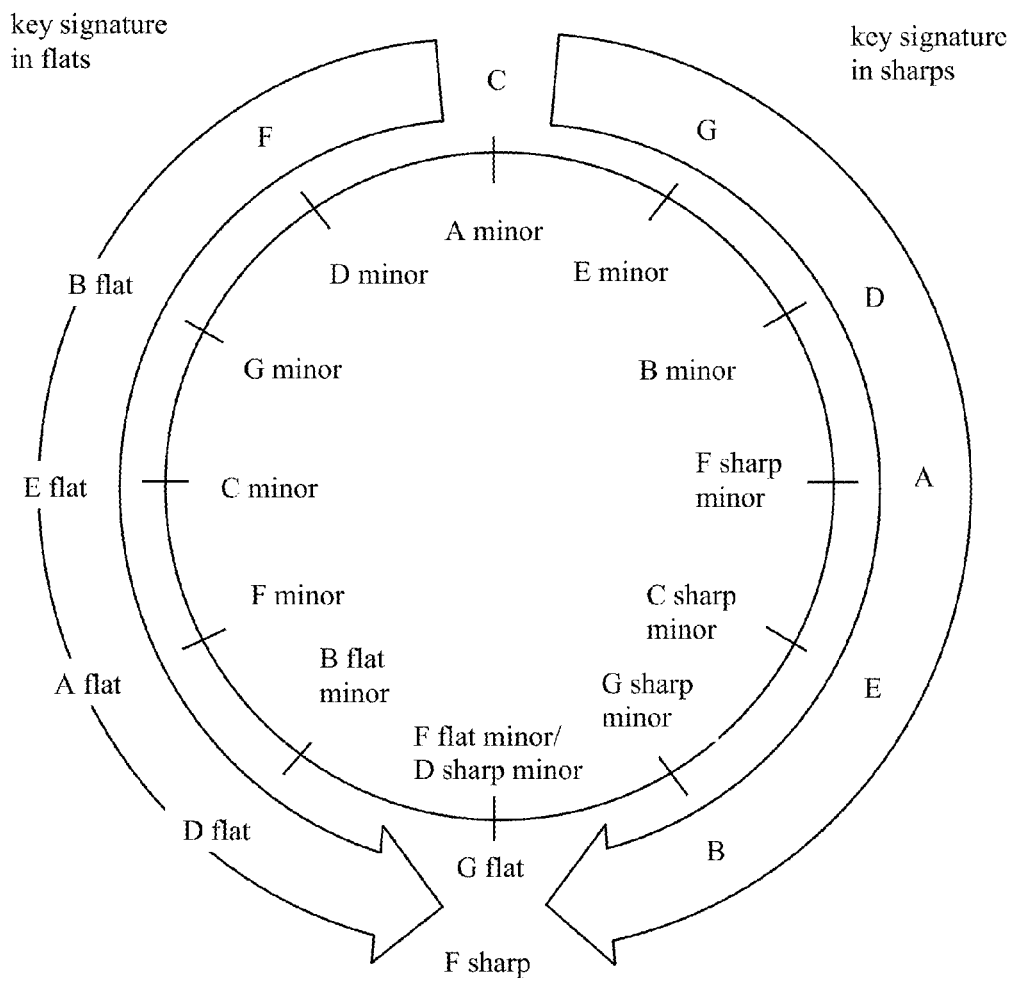
FIG. 7 is a schematic illustrating a further embodiment of a musical representation of a biometric identification.

FIG. 7 is a graph illustrating a musical representation of a fingerprint biometric based on the curvature of the fingerprint ridge pattern. As shown in FIG. 7, the curvature of the fingerprint ridge pattern causes key signatures to be influenced in sharps and flats. The total musical properties for the musical biometric representation are 24 major & minor keys, seven octaves (not using the minor third) and 26 key signatures, each in sharp and flat. This graph can also be used with combined fingerprint and sweat gland pore biometrics. For example, the basic musical representation is determined by the curvature of the fingerprint ridge pattern which causes key signatures to be influenced in sharps and flats and variable sweat gland pore features such as size or activity level affect the volume, base intensity, chords, etc. which means that the musical representation will never by the same each time the individual's biometrics are measured. Since the brightness of the fluorescence or level of sweat gland pore activity are indicative of an individual's mood or psychological state, the sweat gland pore biometric may be used to vary the volume or tempo of the musical representation.

Alternatively, the biometric audio signal may be derived from an individual's barcode identifier. This biometric audio signal may be used as the audio signal broadcast to confirm positive biometric identification according to the optional feature of step 316 of the process illustrated in FIG. 3.

The present invention may also be adapted to detect and analyze the composition of the sweat contained in or secreted from an individual's sweat glands. To this end, the top surface of the transparent electrode may be coated with a transparent film that is designed to detect certain components in an individual's sweat. For example, it is known that sweat contains an individual's DNA fragments which may be detected and used as another source of biometric identification information. In addition, it is also known that sweat contains chemical compositions indicative of substances ingested by an individual such as alcohol or drugs (prescription or illicit). Moreover, the amounts of detected compositions in an individual's sweat may be indicative of the prevailing amount of alcohol or drugs in the individual's blood stream. Therefore, for example, the detection of an amount of a particular substance in an individual's sweat may be used to determine if the individual has a blood alcohol content exceeding a permissible limit. Similarly, this detection system may be used to determine if an individual is under the influence of an illicit drug. By way of further example, the detection of a substance indicative of the presence or level of a prescription drug in the individual's blood stream may be useful as a non-invasive method of determining whether an individual has a particular medical condition that merits attention.

Further, the present invention may be adapted to detect and analyze the composition of the sweat secreted from an individual's sweat pores for medical diagnostic purposes. For example, the chemical composition or temporal variation in the chemical composition of an individual's sweat may be indicative of the individual's health condition, including whether the individual has contracted a disease or illness.

Furthermore, the present invention may be adapted to detect, analyze and treat diseases such as cancerous skin cells. Specifically, the present invention may be adapted to detect cancerous skin cells based on detected variations, disturbances or fluctuations to an induced electromagnetic field. The present invention may further be configured to analyze the detected electromagnetic field disturbances and generate a subsequent customized electromagnetic field to treat the cancerous skin cells.

Moreover, the present invention may be adapted to detect and analyze the residual material or substances on an individual's dermal surface. To this end, the top surface of the transparent electrode may be covered with a transparent film which is designed to detect the existence of certain substances residing on the individual's dermal surface. For example, the transparent film may be used to detect any residual explosives material on an individual's fingers or palms. This information could be particularly useful for identifying individuals who may present potential security threats.

With regard to each of the detection systems for indicators based on the composition of the sweat or residual material or substances on the individual's dermal surface, the apparatus of FIG. 1 may be adapted to include a display screen for viewing by a security agent.

The biometric identification system of the present invention is particularly useful in a mobile system comprising a portable biometric identification detection device coupled via a communication network with a central database. To this end, the portable device may comprise a network communication interface for communicating with the central database. Alternatively, the portable device may comprise an external communication interface configured to communicate with a network device (such as a personal computer) having a network communication interface. The external communication interface may be a serial communication interface such as a universal serial bus or a wireless communication interface such as Bluetooth protocol.

Figure 8:
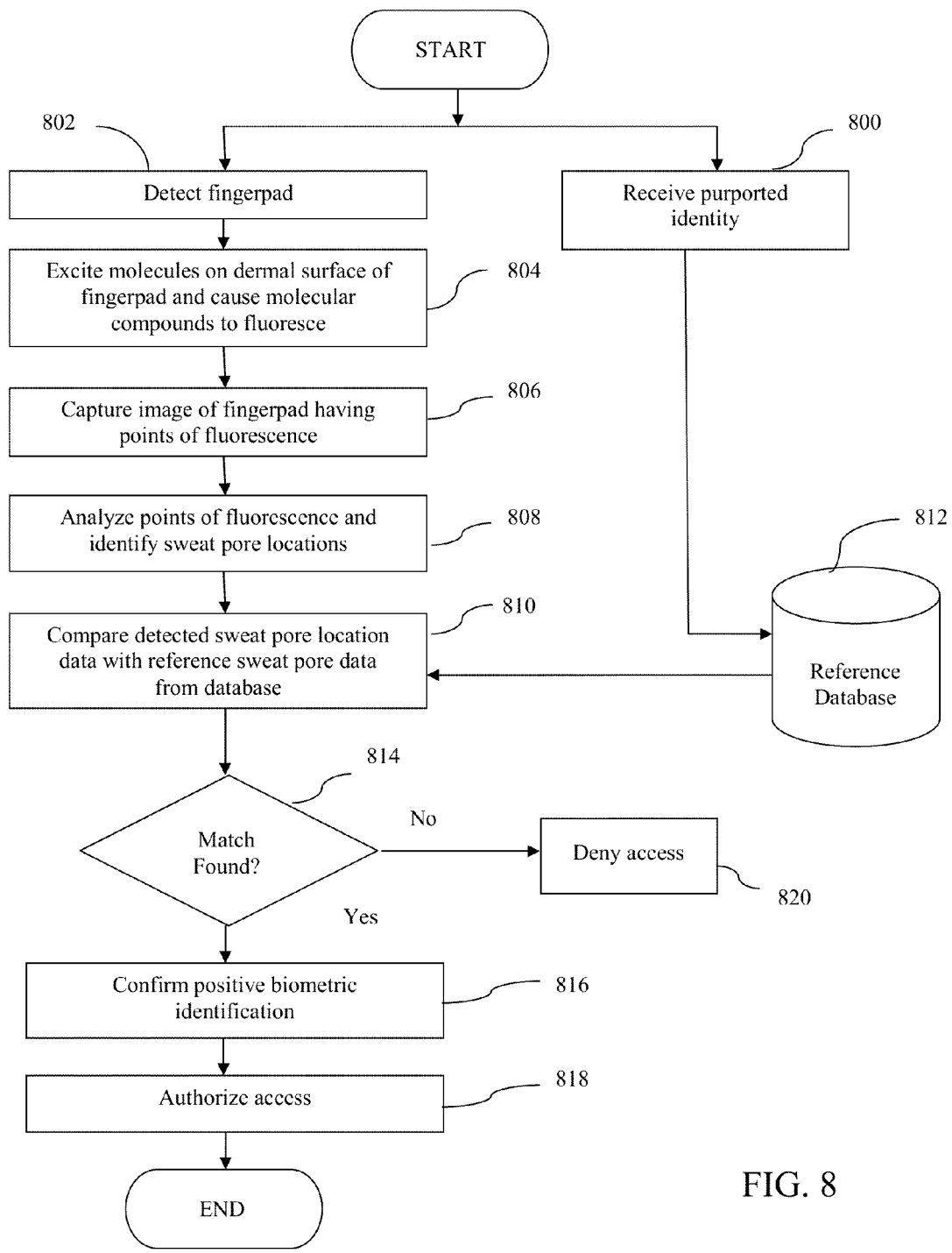
FIG. 8 is a flowchart illustrating an exemplary authentication process based on the detection and analysis of sweat pores with in accordance with the present invention.

The present invention may also be used as a biometric authentication system for verifying the purported identity of an individual. FIG. 8 is a flowchart illustrating an exemplary biometric authentication process based on the detection and analysis of sweat pores in accordance with the present invention. The process shown in FIG. 8 may be implemented in a biometric system using, for example, the apparatus shown in FIG. 1.

The process begins when the apparatus receives an alleged identity from the subject individual (step 800). This step can be implemented where, for example, the subject individual presents an identification badge, passport, credit card, bank ATM card, VPN token or any other source of identification to a reader, scanner or any other device configured to receive identification information from the identification source. The apparatus itself may comprise a reference biometric identification database and perform the biometric authentication process. Alternatively, the authentication system may comprise a remote server configured to perform the authentication process and/or a remote database containing reference biometric identification information, wherein the server and/or database reside, for example, on a LAN, WAN or the Internet. For example, with regard to identification sources such as a credit card, bank ATM card or VPN token, the biometric authentication system may comprise a computer device having a network interface configured to communicate via a network, such as a LAN, WAN or the Internet, with a remote server and central database.

The process also proceeds from steps 802 to 808 in the same manner as described above with regard to the process illustrated in FIG. 3. As shown in FIG. 8, the purported identity information is inputted to the secure database 812, which in turn, submits reference biometric identification data for comparison with the detected sweat pore biometric data (step 810). After comparing the detected sweat pore biometric information with the stored reference biometric information, a determination is made as to whether the detected sweat pore biometric information matches the reference biometric identification data (step 814). If no match is found (no output of step 814), the process proceeds to step 820. If a match is found (yes output of step 814), the process proceeds to step 816 where an indicator is provided confirming a positive biometric authentication. Such an indicator is an optional feature of the invention and may include a visual display and/or an audio signal. The process then proceeds to step 820 where the biometric authentication system authorizes access to a secure area or device.

Thus, having described several embodiments, it will be recognized by those skilled in the art that various modifications, alternative configurations, and equivalents may be used in connection with the practice of the present invention. For example, the biometric identification and authentication processes of the exemplary embodiments illustrated in FIGS. 3-5 and 8 provide for authorized access to a secure area or device upon successful biometric identification or authentication. However, it will be understood that these processes may also be used in other contexts, including authorization for a commercial credit transaction or banking transaction. With regard to a commercial credit transaction, for example, the biometric identification and liveness process illustrated in FIG. 4 may be modified such that step 418 authorizes the execution of a commercial credit transaction involving an individual's online account. In this example, step 418 would involve transmitting a communication to a secure database authorizing a credit transaction for a specific account. The communication may be encoded with the individual's biometric data obtained from either the captured fingerpad image or the matching entry from the reference database for identifying the individual's account on the secure database. Such a system would circumvent many of the most prevalent identify theft issues as it would eliminate the need for an individual to present a credit card account number and use signature authorization. In addition, the written receipt confirming this transaction and the purchased product may be linked together by labeling or stamping each with the purchaser's identification bar code. This use of the individual's identification bar code may function as a theft deterrent system for a retailer and it may also function to confirm the authenticity of the original transaction in connection with the return of a product to the retailer for refund or exchange.

Figure 9:
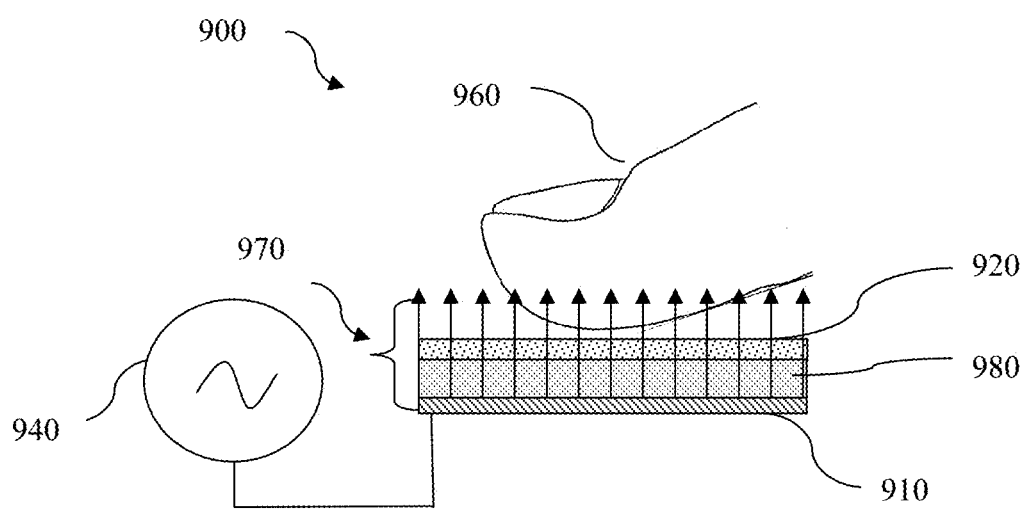
FIG. 9 is a schematic diagram of a sweat pore biometric detection apparatus according to an alternative embodiment of the present invention.

FIG. 9 is a schematic diagram illustrating another embodiment of the present invention for biometric identification and proof of liveness based on the detection and analysis of sweat gland pores on an individual's fingerpad. As shown in FIG. 9, the biometric identification apparatus 900 comprises a voltage source 940, an electrode 910 and an electromagnetic field reader 980. Voltage source 940 is configured to generate an electrical current through electrode 910, which induces an electromagnetic field 970. Preferably, voltage source 940 is an alternating current voltage source and the resulting alternating electrical current transmitted through electrode 910 is sufficient to induce an electromagnetic field of necessary magnitude to provide measurable variations, fluctuations or disturbances to the electromagnetic field corresponding to the physical contours of the sweat gland pores on an individual's dermal surface. In one embodiment, the resulting alternating electrical current may be between about 0.01 milliamps and about 25 milliamps and have a frequency of 60 Hz or less. In another embodiment, the resulting electrical current may be between about 0.5 milliamps and about 5.0 milliamps and have a frequency of between about 20 to about 50 Hz. It will be understood, however, that any electrical current that induces an electromagnetic field which enables biometric identification and/or proof of liveness based on the detection and analysis of sweat gland pores falls within the scope of the present invention. For example, a current greater than about 25 milliamps and having a frequency greater than 60 Hz (e.g., 64 MHz or higher) may be used if a suitable insulator is used to prevent physiological reaction with an individual's dermal surface. Similarly, a current less than about 0.01 milliamps may be used if a suitable amplifier or other device is used to enable the detection of the variations, fluctuations or disturbances to the electromagnetic field caused by the interaction with the individual's dermal surface. In addition, the electromagnetic field may be induced by a pulsed electrical current. Although not shown in FIG. 9, it will be appreciated that the electrical circuitry of apparatus 900 is configured to provide the desired electrical current through the electrode 910, which, in turn, induced electromagnetic field 970. It will be understood that the specific form of the electrical circuitry including the use of a transparent conductive surface is optional for the practice of the present invention. Any electrical circuitry for providing an electrical charge to induce an electromagnetic field sufficient to provide measurable variations, fluctuations or disturbances to the electromagnetic field corresponding to the physical contours of the sweat gland pores on an individual's dermal surface falls within the scope of this invention. For example, the electrical circuitry need not include a transparent conductive surface, and instead may include an electrical circuitry which induces an electromagnetic field in a local environment.

As shown in FIG. 9, electromagnetic field reader 980 may be integrally formed with electrode 910. Alternatively, it will be understood that electromagnetic field reader 980 may be positioned separately from electrode 910 at any location that is suitable for monitoring electromagnetic field 970. As with the embodiment of the invention disclosed and described in connection with FIG. 1, the electrode may comprise a transparent conductive material such as Indium Tin Oxide (ITO), or the like. In addition, the apparatus shown in FIG. 9 may optionally include a glass substrate, such as optical glass, or the like. The top surface of the apparatus configured to receive the individual's fingerpad may optionally be coated with a polymer material 920 to prevent electrical charge from being transmitted to the individual's fingerpad.

According to this embodiment, the electrode 910 is configured to emit an electromagnetic field 970 induced by the electrical current generated by voltage source 940. Electromagnetic field reader 980 is configured to detect and capture information regarding electromagnetic field 970, including any variations, fluctuations or disturbances thereto when an individual's fingerpad is placed in the proximity of electromagnetic field 970. Apparatus 900 may include a controller (not shown) configured to interface with the electromagnetic field reader 980 and analyze the electromagnetic field information detected by the electromagnetic field reader 980 when the individual's fingerpad is placed in the proximity of electromagnetic field 970. The controller may comprise a graphics processor capable of storing, processing and/or generating an image representative of the electromagnetic field information detected by electromagnetic field reader 980.

It is also contemplated that quantum atom theory concepts associated with electromagnetic fields may be applied with regard to the detection, communication and comparison of biometric information based on the variations, fluctuations or disturbances in electromagnetic field 970. For example, the variations, fluctuations or disturbances to the electromagnetic field detected by the electromagnetic field reader 980 may be measures of atoms distorting the geometry of space and time ("spacetime") in the electromagnetic field. Further, the detected biometric information may be stored and communicated to a remote database via geometric fractals associated with the electromagnetic field.

Apparatus 900 may alternatively comprise an image capture device configured to obtain an image of the visible light range of the electromagnetic spectrum resulting from the interaction of an individual's fingerpad (an in this example, the sweat gland pores on the fingerpad) with electromagnetic field 970. According to this alternative arrangement, the image capture device is operatively coupled to the controller and the controller is configured to analyze the biometric information contained in the image of the visible light range of the electromagnetic spectrum.

Without wishing to be bound by any particular scientific theory or explanation, applicant believes that the physical characteristics of the sweat gland pores and/or the materials contained therein have conductive properties which interact with and cause variations, fluctuations or disturbances to electromagnetic field 970. Moreover, the detected variations, fluctuations or disturbances to electromagnetic field 970 are indicative of the location, shape and size of the sweat gland pores. It is also believed that the unique concaved contour of the sweat gland pore also interacts with and causes variations, fluctuations and disturbances to the electromagnetic field from which sweat gland pore biometric information may be derived. Surprisingly, applicant has discovered that this method also detects the location of closed or clogged sweat gland pores. This unexpected result provides enhanced reliability for the detection of sweat gland pore biometric identification.

Figure 10:
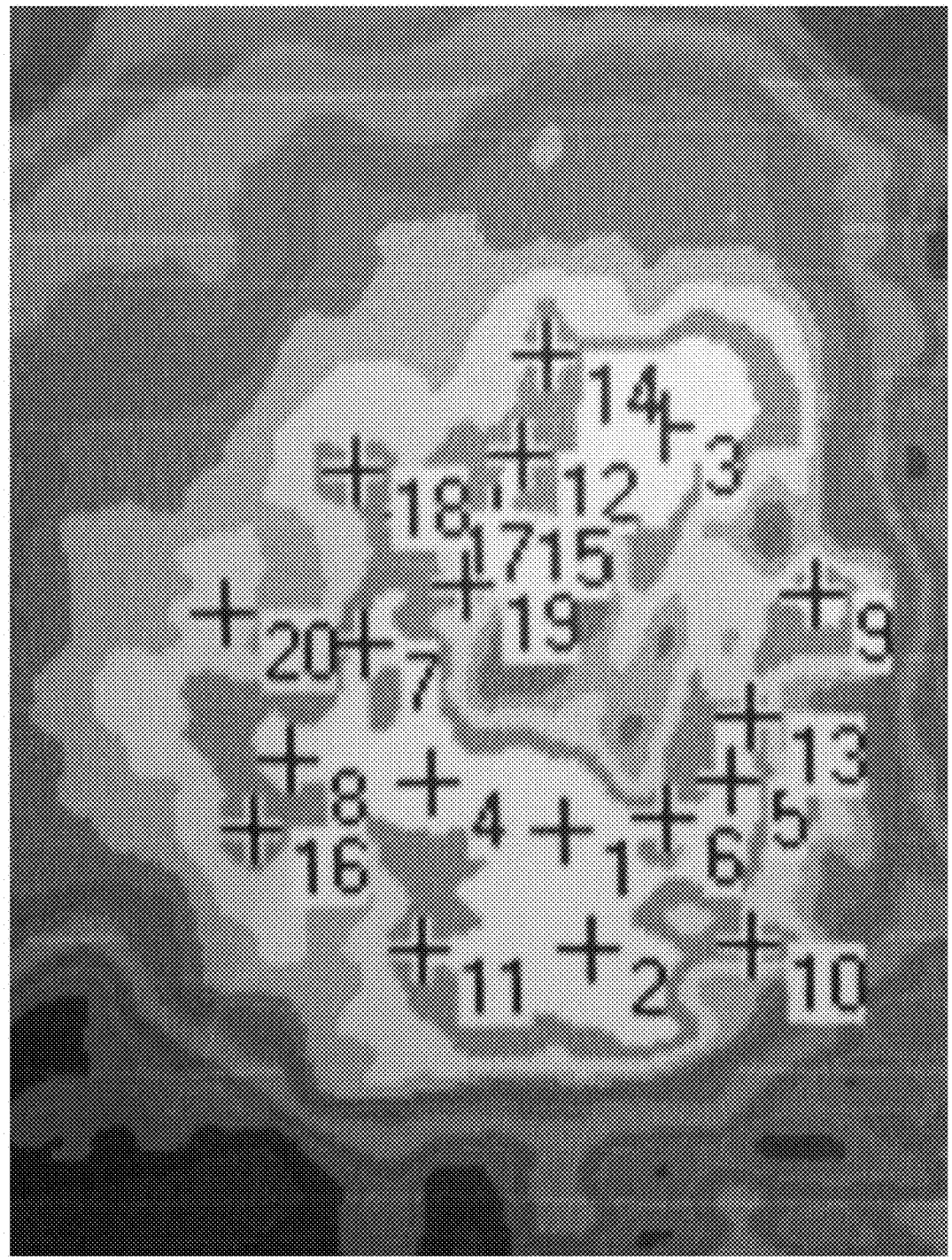
FIG. 10 is a schematic diagram of a sweat pore biometric detection apparatus according to an embodiment of the present invention.

FIG. 10 is an image of the visible light range of the electromagnetic spectrum representing sweat gland pore biometric information. This image may be obtained by an image capture device or generated by a graphics processor based on electromagnetic field data detected by an electromagnetic field reader. The image represents three sweat gland pore biometric measures derived from the variations, disturbances and fluctuations in the electromagnetic field 970. Each cross mark (separately numbered 1-20) represents the x- and y-coordinate locations of a sweat gland pore on a two-dimensional matrix. In addition, the activity level of each sweat gland pore contributes to the intensity of the electromagnetic disturbance, wherein the level of the intensity of the electromagnetic disturbance is manifested by the a color within the visible electromagnetic spectrum. Moreover, multiple sweat gland pores having similar intensity may be manifested by color groupings in the image. These color groupings also correspond to the brightness of the fluorescence of the sweat gland pores as detected by the embodiment of the invention described above with reference to FIG. 1. Sweat gland pores 1-9 form a first cluster of sweat gland pores which define the white region of the image and have the highest activity level or brightest fluorescence. Similarly, sweat gland pores 10-18 form a second cluster of sweat gland pores which define the blue region in the image and have the second highest activity level or fluorescence. Sweat gland pores 19 and 20 form a third cluster of sweat gland pores which define the yellow region in the image and have the third highest activity level or fluorescence. It will be understood that each of these colored regions may also include closed or clogged pores not designated by a cross mark and which do not contribute any intensity level or fluorescence to the image.

The x- and y-locations of the sweat gland pores and the configuration of the colored regions show in the image of FIG. 10 can be used as a combined biometric measure and proof of liveness. First, the x- and y-locations of the sweat gland pores are a static biometric that can be compared with a reference biometric for authentication or verification purposes. Because sweat gland pores may become clogged or closed at any given time, a comparison of the detected and reference sweat gland pore locations which yields a sufficient number of positive matching detected sweat gland pores results in a positive identification. Because the activity level of any given sweat gland pore varies over time, a sufficient minimal variation in the configuration of the colored regions of the image is indicative of proof of liveness.

Figure 11:
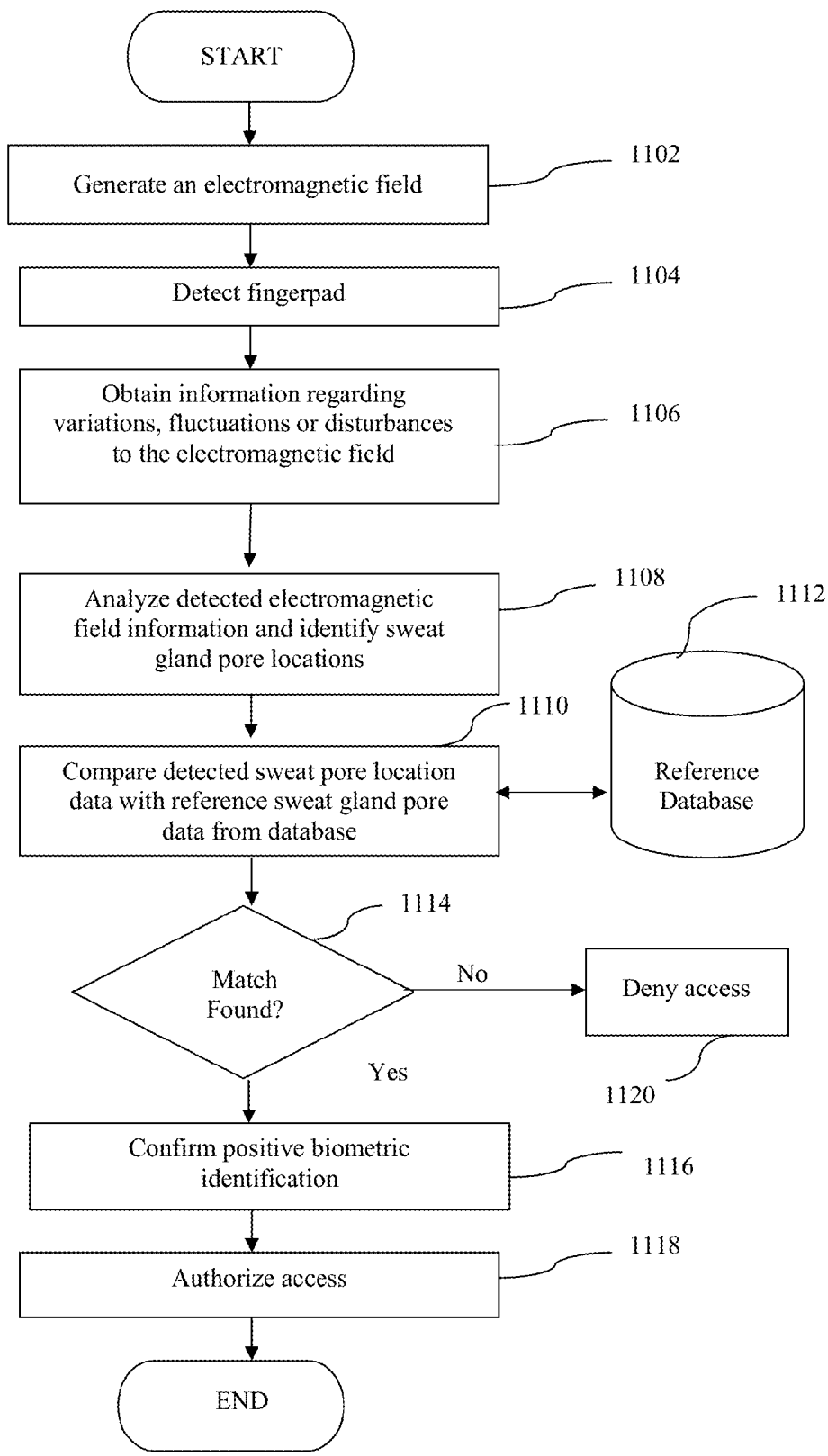
FIG. 11 is a flowchart illustrating an exemplary process for the detection and analysis of sweat pores for biometric identification according to the present invention.

FIG. 11 is a flowchart illustrating an exemplary process for a biometric identification and proof of life system using the apparatus shown in FIG. 9. In the initial state (step 1102), voltage source 940 generates an electrical current in electrode 910, which, in turn, induces an electromagnetic field 970 across the surface configured for receiving the individual's fingerpad. The sweat pore biometric identification system then detects the individual's fingerpad (step 1104). Subsequent to detecting the fingerpad in step 1104, the electromagnetic field reader obtains information regarding variations, fluctuations or disturbances to the electromagnetic field resulting from interaction with the electromagnetic field by the individual's fingerpad (step 1106). These variations, fluctuations or disturbances are then correlated to identify the detected locations and physical contours, including the size and shape, of the sweat gland pores (step 1108).

Next, the sweat gland pore biometric identification system uses an algorithm to compare the detected sweat gland pore biometric information with reference biometric information stored in a repository, such as Reference Database 1112 (step 1110). The step of analyzing the detected sweat gland pore biometric information may be performed by the sweat gland pore biometric identification apparatus 900 or a separate device (e.g., a secure network server or a local computer device) coupled in communication with apparatus 900. Similarly, the step 1110 of comparing the detected biometric information with the biometric information stored in a repository may be performed by the sweat pore biometric identification apparatus 900 or a separate device coupled in communication with apparatus 900. Reference Database 1112 may be maintained on the apparatus 900, a local storage device or a remote storage device. For security purposes, communications within the sweat pore biometric identification system (e.g., between apparatus 900 and Reference Database 1112) are preferably encrypted. For this same reason, data stored on Reference Database 1112, apparatus 900 or any other device used in the sweat pore biometric identification system is preferably encrypted. Accordingly, apparatus 900 comprises cryptographic capabilities for encrypting transmitted communications, decrypting received encrypted communications and encrypting stored data.

After comparing the detected sweat pore biometric information with the stored reference biometric information, a determination is made as to whether the detected sweat pore biometric information matches an entry on the reference database (step 1114). If no match is found (no output of step 1114), the process proceeds to step 1120. If a match is found (yes output of step 1114), the process proceeds to step 1116 where an indicator is provided confirming a positive biometric identification. Such an indicator is an optional feature of the illustrated process and may include a visual display and/or an audio signal. The process then proceeds to step 1118 where the biometric identification system authorizes access to a secure area or device.

In the same general manner described above with reference to FIG. 11, the alternative embodiment illustrated in FIG. 9 may also be implemented in a sweat gland pore biometric identification system and liveness system as described in connection with FIG. 4. With regard to the apparatus shown in FIG. 9, it will be understood that the detected sweat gland pore location, shape and size information constitutes proof of liveness since these are not static biometrics for a living being. For example, proof of liveness can be determined if there is sufficient match between the detected and referenced sweat gland pore locations and at least a minimal variation between the shape and size of the matching sweat gland pores.

Similarly, the alternative embodiment illustrated in FIG. 9 can also be implemented in a dual biometric identification system involving the detection and analysis of sweat gland pore and fingerprint information. To this end, the apparatus illustrated in FIG. 9 may be modified to include a transparent electrode and an image capture or scanning device to obtain the individual's fingerprint biometric information. The sweat gland pore and fingerprint verification steps may occur in parallel as shown in FIG. 5 or in series.

In addition, the alternative embodiment of the present invention illustrated in FIG. 9 may be implemented in an authentication process based on the detection and analysis of sweat gland pore information as generally described in FIG. 6.

The embodiment shown in FIG. 9 may also be configured as a biometric tape or film for use in a variety of applications. In the same manner described above with reference to FIG. 9, the biometric tape comprises a conductor which is configured to carry an electrical current and generate an electromagnetic field. The biometric tape further comprises an electromagnetic field reader which detects the distribution of the electromagnetic field generated by the conductor. When an individual contacts the biometric tape, the electromagnetic field reader detects any variations, fluctuations or disturbances to the distribution of the electromagnetic field generated by the electrical current in the conductor. The biometric tape may further comprise a voltage source for generating the electrical current, a graphics processor for processing the data detected by the electromagnetic field reader and/or generating a graphic representation depending on the result of the authentication or verification process, a memory for storing the detected biometric information and a wireless communication interface for transmitting the detected biometric information to a remote network for comparison with reference biometric information for authentication or verification. Alternatively, the biometric tape memory may be configured to store the reference biometric information and the biometric tape processor may be configured to perform the authentication or verification routines. In addition, the voltage source may be external to the biometric tape.

It will be understood that the biometric tape or film may be flexible and lend itself to many different applications. For example, the biometric tape or film may be integrated into the outer surface glove (e.g., the palm and/or finger portions of the glove) and enable an individual wearing the glove to perform biometric identification of an individual who contacts the outside surface of the glove. In addition, the tape or film may be placed on an object such as a door knob or automobile door handle to detect the biometric identity of any individual who attempts to open the door. The biometric tape or film may be applied to any other device or substrate (such as a telephone handset or automobile steering wheel) that may be contacted by an individual's dermal surface containing sweat gland pores.

Figure 12:
FIG. 12 is an illustration of a triggering system for capturing biometric identification information according to the present invention.

The detection systems according to the present invention may further comprise a sensor which detects an individual's finger in the proximity of the top surface of the electrode and actuates the image capture device or voltage source to generate an electrical current through electrode, which, in turn, induces the electromagnetic field. In the embodiment shown in FIG. 1, image capture device 150 may be configured to constantly monitor for any object that is placed in the vicinity of the transparent electrode 110. The image capture device 150 may be further configured to detect the general characteristics of a fingerprint. As shown in FIG. 12, for example, such general characteristics may be the width of the fingerprint ridges A separated by a fingerprint valley or trough B. When the image capture device recognizes these general features of a fingerprint having fingerprint ridge widths A within specified ranges and distances between fingerprint ridges B within specified ranges in the vicinity of the transparent electrode, it will automatically trigger an image capture of the fingerpad to obtain an image of the fluoresced biological points excited by the electromagnetic field.

With regard to the embodiment of the present invention shown in FIG. 9, the electromagnetic field reader may be configured to detect a fingerpad in the vicinity of the electromagnetic field. For example, the electromagnetic field reader may be in constant detection mode for the variations, fluctuations or disturbances to the electromagnetic field that are indicate of the features of a fingerpad. The detection of electromagnetic field disturbances representative of the general shape and size of one or more sweat gland pores may act a trigger for the electromagnetic field reader to obtain more extensive information regarding the disturbances to the entire electromagnetic field distribution. Alternatively, the electromagnetic field reader may be triggered by the detection of disturbances representative of the presence of sweat gland crystals in the electromagnetic field.

What is claimed is:

1. An apparatus for biometric authentication based on biometric information sensed from an individual's dermal surface, comprising:
    (a) a device configured to induce an electromagnetic field in the vicinity of the individual's dermal surface;
    (b) a sensor configured to detect variations, fluctuations or disturbances to the electromagnetic field when the individual's dermal surface is in the vicinity of the electromagnetic field; and
    (c) a controller configured to: (1) identify the location and activity of at least one sweat gland pore on the individual's dermal surface derived from the detected variations, fluctuations or disturbances to the electromagnetic field; (2) compare the identified location and activity of at least one sweat gland pore derived from the detected variations, fluctuations or disturbances to the electromagnetic field with reference sweat gland pore location and activity data; and (3) determine whether a match is found between the identified location and activity of at least one sweat gland pore derived from the detected variations, fluctuations or disturbances to the electromagnetic field and the reference sweat gland pore location and activity data.

2. The apparatus according to claim 1, wherein the device comprises an electromagnetic field generator.

3. The apparatus according to claim 2, wherein the electromagnetic field generator comprises a voltage source configured to transmit an alternating current of between about 0.01 milliamps and about 25 milliamps and a frequency of about 60 Hz or less through an electrode.

4. The apparatus according to claim 2, wherein the electromagnetic field generator comprises a voltage source configured to transmit an alternating current of between about 0.5 milliamps and about 5 milliamps and a frequency of between about 20 Hz and about 50 Hz through an electrode.

5. The apparatus according to claim 1, wherein the sensor comprises an electromagnetic field reader.

6. The apparatus according to claim 1, wherein the controller comprises a graphics processor.

7. The apparatus according to claim 1, wherein the activity of the sweat gland pore is represented by the magnitude of the detected variation, fluctuation or disturbance to the electromagnetic field.

8. The apparatus according to claim 1, wherein the controller is configured to generate an image derived from the detected variations, fluctuations or disturbances to the visible light range of the electromagnetic field.

9. The apparatus according to claim 8, wherein the activity of the sweat gland pore is represented by the magnitude of the detected variation, fluctuation or disturbance to the visible light range of the electromagnetic field.

10. The apparatus according to claim 8, wherein the activity of the sweat gland pore is represented by a color within the visible light range of the electromagnetic field.

11. The apparatus according to claim 8, wherein a plurality of sweat gland pores having substantially the same activity are represented by the substantially the same color within the visible light range of the electromagnetic field.

12. The apparatus according to claim 1, wherein the sensor comprises an image capture device configured to obtain an image of the visible light range of the electromagnetic spectrum derived from the detected variations, fluctuations or disturbances of the electromagnetic field.

13. The apparatus according to claim 1, wherein the reference sweat gland pore location and activity data is stored on the apparatus.

14. The apparatus according to claim 1, wherein the reference sweat gland pore location and activity data is accessed from a remote storage device.

15. The apparatus according to claim 1, wherein the reference sweat gland pore location and activity data is encrypted.

16. A method for biometric authentication based on biometric information sensed from an individual's dermal surface, comprising the steps of:
    (a) inducing an electromagnetic field in the vicinity of the individual's dermal surface;
    (b) detecting variations, fluctuations or disturbances to the electromagnetic field;
    (c) identifying the location and activity of at least one sweat gland pore on the individual's dermal surface derived from the variations, fluctuations or disturbances to the electromagnetic field;
    (d) comparing the identified location and activity of at least one sweat gland pore derived from the variations, fluctuations or disturbances to the electromagnetic field with reference sweat gland pore location and activity data; and (e) determining whether a match is found between the identified location and activity of at least one sweat gland pore derived on the variations, fluctuations or disturbances to the electromagnetic field and the reference sweat gland pore location and activity data.

17. The method according to claim 16, further comprising the step of making a positive biometric authentication in response to determining that the match is found.

18. The method according to claim 16, further comprising the step of receiving a purported identity of the individual and wherein the reference sweat gland pore location and activity data comprises reference sweat gland pore location and activity data for the purported identity of the individual.

19. The method according to claim 16, wherein the step of inducing an electromagnetic field in the vicinity of the individual's dermal surface comprises transmitting an alternating current of between about 0.01 milliamps and about 25 milliamps and a frequency of about 60 Hz or less through an electrode.

20. The method according to claim 16, wherein the step of inducing an electromagnetic field in the vicinity of the individual's dermal surface comprises transmitting an alternating current of between about 0.5 milliamps and about 5 milliamps and a frequency of between about 20 Hz and about 50 Hz through an electrode.

21. The method according to claim 16, wherein the activity of at least one sweat gland pore is represented by the magnitude of the detected variation, fluctuation or disturbance to the electromagnetic field.

22. A method for establishing liveness of a biometric subject, comprising the steps of:

(a) inducing an electromagnetic field in the vicinity of the individual's dermal surface;

(b) detecting variations, fluctuations or disturbances to the electromagnetic field;

(c) identifying the location and activity of at least one sweat gland pore on the individual's dermal surface derived from the variations, fluctuations or disturbances to the electromagnetic field;

(d) comparing the identified location and activity of at least one sweat gland pore with corresponding reference sweat gland pore location and activity;

(e) determining whether there is at least some minimal variation between the activity of at least one identified sweat gland pore location and the activity of at least one corresponding reference sweat gland pore location.

23. The method according to claim 22, wherein the step of inducing an electromagnetic field in the vicinity of the individual's dermal surface comprises transmitting an alternating current of between about 0.01 milliamps and about 25 milliamps and a frequency of about 60 Hz or less through an electrode.

24. The method according to claim 22, wherein the step of inducing an electromagnetic field in the vicinity of the individual's dermal surface comprises transmitting an alternating current of between about 0.5 milliamps and about 5 milliamps and a frequency of between about 20 Hz and about 50 Hz through an electrode.

25. The method according to claim 22, wherein the activity of at least one sweat gland pore is represented by the magnitude of the detected variation, fluctuation or disturbance to the electromagnetic field.

* * * * *